Sept. 18, 1934. A. J. MUSSELMAN 1,974,247
FOOT PEDAL
Filed March 12, 1934 2 Sheets-Sheet 1
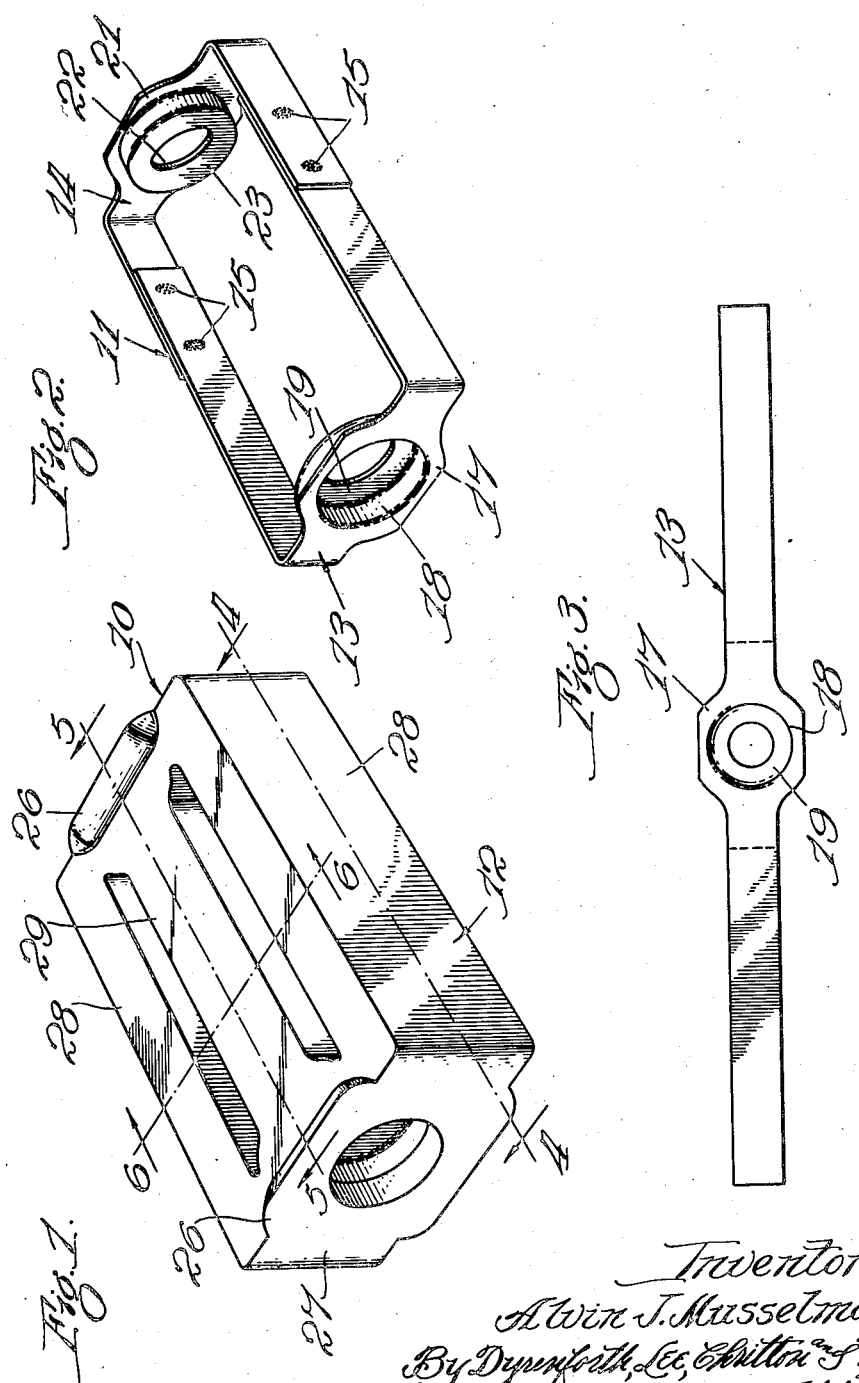

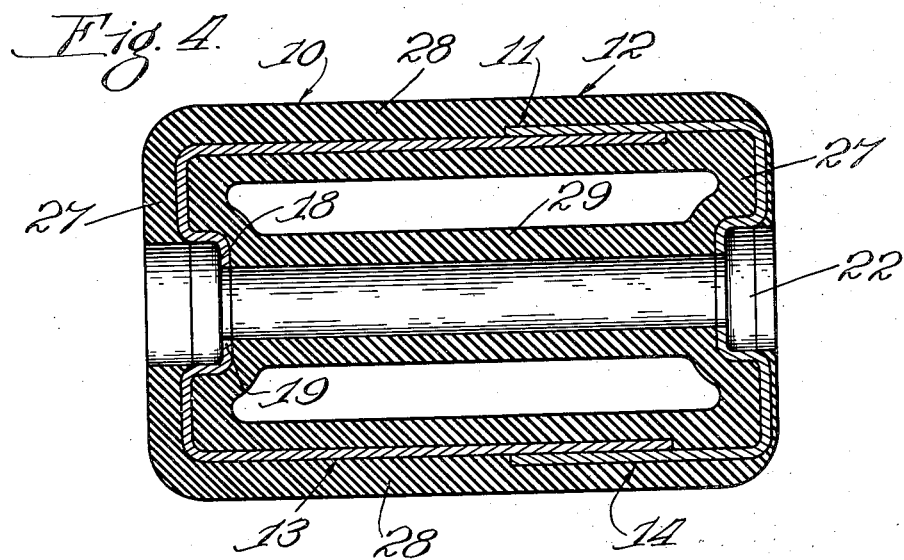
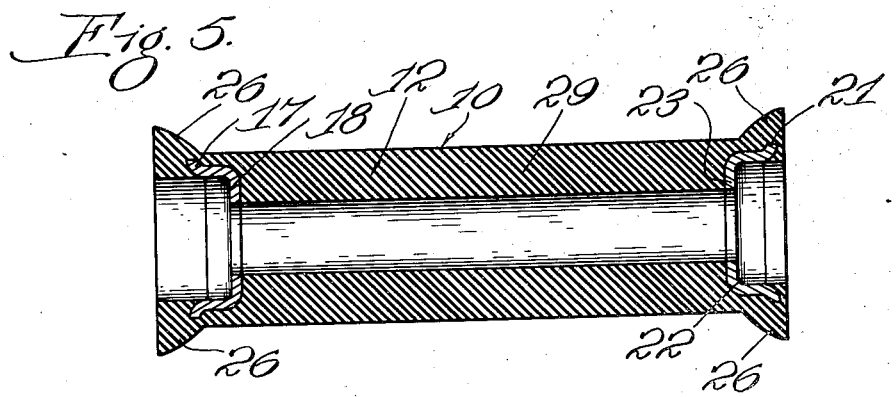
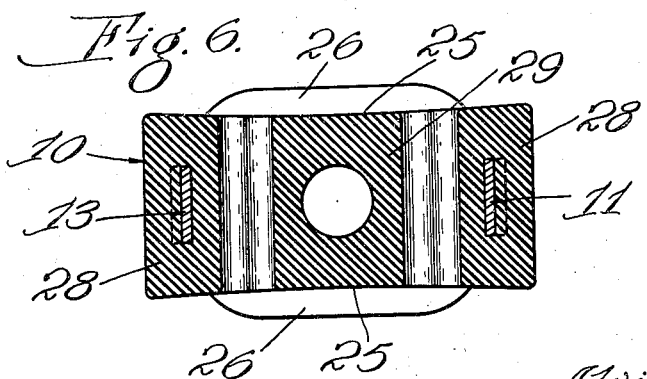

Patented Sept. 18, 1934

1,974,247

UNITED STATES PATENT OFFICE 1,974,247

FOOT PEDAL

Alvin J. Musselman, Cuyahoga Falls, Ohio

Application March 12, 1934, Serial No. 715,241

5 Claims. (Cl. 208—70)

The invention relates to foot pedals and is particularly adapted to be embodied in foot pedals for bicycles.

An object of the invention is to provide a foot pedal of the kind described which will be neat and attractive in appearance, durable and relatively simple in construction.

One form of the invention is embodied in a foot pedal which comprises two U-shaped members formed of strap metal, the U-shaped members being welded to each other. Each of the members is provided with a cup-shaped depression to hold the outer race of a ball-bearing and the depressions are alined in such manner that a stub shaft, or the equivalent, may extend through the ball-bearings which pivot the pedal. The U-shaped members are embedded in plastic material which preferably comprises a rubber compound, or the equivalent, molded and cured on the U-shaped members.

Other objects will become apparent as the following detailed description progresses, reference being had to the accompanying drawings, wherein Fig. 1 is a perspective view of a foot pedal which embodies the invention and is adapted for use on a bicycle.

Fig. 2 is a perspective view of a rectangular metallic member which forms part of the improved pedal shown in Fig. 1.

Fig. 3 is a developed view of a U-shaped member which forms part of the rectangular metallic member shown in Fig. 2.

Fig. 4 is a section taken on line 4—4 of Fig. 1.

Fig. 5 is a section taken on line 5—5 of Fig. 1, and

Fig. 6 is a section taken on line 6—6 of Fig. 1.

Referring to the drawings wherein a preferred embodiment of the invention is shown, the reference character 10 designates generally a foot pedal which embodies the invention and is particularly adapted for use as a bicycle pedal.

The pedal 10 comprises a rectangular metallic member 11 embedded in a molded body 12 formed of a rubber compound, or the equivalent, for the purpose. The rectangular metallic member 11 comprises U-shaped members 13 and 14 provided with overlapping legs which are preferably spot-welded to each other as indicated at 15 (Fig. 2).

The U-shaped members 13 and 14 are preferably formed from sheet or strap metal, iron or steel being preferably employed for this purpose. The U-shaped member 13 is provided with an enlarged portion 17 intermediate its ends, which enlarged portion 17 is provided with an inwardly extending depression or recess 18, the inner end of the recess 18 being partly closed by an apertured disc or hole 19 formed integral with the U-shaped member 13. The recess 18 is preferably cylindrical in form and is adapted to hold the outer race of a ball-bearing (not shown). The U-shaped member 14 is provided with an enlarged portion 21 provided with an inwardly extending recess 22 which is partly closed at its inner end by an apertured disc or hole 23. The enlarged portion 21, the recess 22 and the hole 23 are preferably identical with the corresponding parts of the U-shaped member 13. The recess 22 is adapted to hold the outer race of a ball-bearing (not shown). It will be readily understood that a stub shaft (not shown), or the equivalent, may extend through the ball-bearings (not shown) mounted in the recesses 18 and 22 and that the stub shaft (not shown), or the equivalent, will co-operate with the ball-bearings (not shown) to rotatably journal the rectangular metallic member 11.

The rectangular metallic member 11 is embedded in the molded body 12 as stated above. The body 12 is formed by placing the rectangular metallic member 11 in a suitable mold and then filling the mold with the material from which the body is to be formed. It will be noted that all surfaces of the rectangular metallic member 11 except the surfaces of the recesses 18 and 22 are covered by the material of the body 12. This protects the metallic member 11 from corrosion. The body 12 is of such proportions that it provides convenient upper and lower surfaces 25 engageable by the bicycle rider. At the ends of the improved pedal, the body 12 is provided with enlarged portions 26 which will prevent the foot of the operator from slipping laterally off of the pedal.

It will be noted that the molded body 12 is an integral member and that it comprises end members 27, side members 28 and a central tubular member 29. The stub shaft (not shown) mounted in the ball-bearings (not shown) passes through the tubular member 29.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

I claim:

1. A foot pedal comprising a rectangular metallic member, and a body of plastic material molded on said rectangular member to substantially cover the same, said rectangular member and said body being apertured to receive means for pivoting the pedal.

2. A foot pedal comprising a rectangular metallic member having recesses in its ends for holding ball-bearings, and a body of plastic material molded on said rectangular member to substantially cover the same.

3. A foot pedal comprising two U-shaped members secured to each other, and a body of plastic material molded on said U-shaped members, said U-shaped members and said body being provided with alined apertures to accommodate means for journaling the pedal.

4. A foot pedal comprising a molded body of plastic material, said molded body being provided with integral end and side members and with a central tubular member, and a rectangular metallic member embedded in and re-enforcing said end and side members, said rectangular metallic member being provided with apertures alined with said tubular member.

5. A foot pedal comprising a molded body of plastic material, said molded body having integral end and side members and an integral central tubular member, said end members being provided with recesses for holding ball bearings in alinement with said tubular member, and a rectangular metallic member embedded in and re-enforcing said end and side members.

ALVIN J. MUSSELMAN.